(12) United States Patent
Zhou et al.

(10) Patent No.: US 11,894,694 B2
(45) Date of Patent: Feb. 6, 2024

(54) WIRELESS CHARGING DEVICE AND TO-BE-CHARGED DEVICE

(71) Applicant: HONOR DEVICE CO., LTD., Guangdong (CN)

(72) Inventors: Haibin Zhou, Guangdong (CN); Zhongyong He, Guangdong (CN); Chen Zhu, Guangdong (CN); Yupeng Qiu, Guangdong (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 117 days.

(21) Appl. No.: 17/776,358

(22) PCT Filed: Mar. 19, 2021

(86) PCT No.: PCT/CN2021/081714
§ 371 (c)(1),
(2) Date: May 12, 2022

(87) PCT Pub. No.: WO2021/227652
PCT Pub. Date: Nov. 18, 2021

(65) Prior Publication Data
US 2022/0399759 A1 Dec. 15, 2022

(30) Foreign Application Priority Data

May 14, 2020 (CN) .......................... 202010404781.6
Feb. 27, 2021 (CN) .......................... 202110221580.7

(51) Int. Cl.
*H02J 50/40* (2016.01)
*H02J 50/12* (2016.01)
*H02J 50/70* (2016.01)
*H02J 50/05* (2016.01)
*H02J 50/20* (2016.01)

(52) U.S. Cl.
CPC ............ *H02J 50/402* (2020.01); *H02J 50/12* (2016.02); *H02J 50/70* (2016.02); *H02J 50/05* (2016.02); *H02J 50/20* (2016.02)

(58) Field of Classification Search
CPC .......... H02J 50/402; H02J 50/40; H02J 50/12; H02J 50/70; H02J 50/05; H02J 50/20
See application file for complete search history.

(56) References Cited

FOREIGN PATENT DOCUMENTS

JP 2012205379 A * 10/2012

* cited by examiner

Primary Examiner — Robert L Deberadinis
(74) Attorney, Agent, or Firm — Conley Rose, P.C.

(57) ABSTRACT

A wireless charging device (20) and a to-be-charged device (10) are provided, to support two or more wireless charging technologies, so as to optimize a circuit design and improve power transmission efficiency. The to-be-charged device (10) includes: a first receiving coil, configured to receive an electromagnetic signal based on a first wireless charging technology, and convert the electromagnetic signal into an alternating current signal; and a second receiving coil, configured to receive an electromagnetic signal based on a second wireless charging technology, and convert the electromagnetic signal into an alternating current signal, where the first wireless charging technology and the second wireless charging technology support different resonance frequency ranges.

20 Claims, 7 Drawing Sheets

WIRELESS CHARGING DEVICE AND TO-BE-CHARGED DEVICE

This application is a national stage of International Application No. PCT/CN2021/081714, filed on Mar. 19, 2021, which claims priority of Chinese Patent Application No. 202010404781.6, filed on May 14, 2020, and Chinese Patent Application No. 202110221580.7, filed Feb. 27, 2021, all of which are hereby incorporated by reference in their entireties.

TECHNICAL FIELD

This application relates to the charging field, and in particular, to a wireless charging device and a to-be-charged device.

BACKGROUND

Wireless charging is an increasingly popular charging manner in recent years, and may be widely applied to fields such as terminal devices, smartphones, tablet computers, wearable devices, vehicle-mounted devices, and electric vehicles. Currently, wireless charging solutions include a plurality of types of wireless charging standards or charging protocols, and are still in continuous development. For example, currently, mainstream wireless charging standards include the Qi standard, the alliance for wireless power (alliance for wireless power, A4WP) standard, the power matters alliance (power matters alliance, PMA) standard, the Wi-Po standard, the invisible power field (invisible power field, iNPOFi) standard, and the like.

Different wireless charging solutions have different charging principles. Therefore, different wireless charging solutions are not compatible. For example, the Qi standard uses electromagnetic induction, and the A4WP standard uses electromagnetic resonance. Therefore, in a wireless charging system, a single-mode charging mode is usually used, that is, only one wireless charging technology is supported. However, as a wireless charging requirement is increasingly high, a single-mode charging manner is limited by a heating power and a coil technology bottleneck, and charging efficiency cannot be further improved. Therefore, a method for improving wireless charging efficiency is urgently needed in the industry.

SUMMARY

This application provides a wireless charging device and a to-be-charged device, to optimize a circuit design and improve power transmission efficiency.

According to a first aspect, a to-be-charged device is provided, including: a first receiving coil, configured to receive an electromagnetic signal based on a first wireless charging technology, and convert the electromagnetic signal into an alternating current signal; and a second receiving coil, configured to receive an electromagnetic signal based on a second wireless charging technology, and convert the electromagnetic signal into an alternating current signal, where the first wireless charging technology and the second wireless charging technology support different resonance frequency ranges.

The two receiving coils that support different wireless charging technologies are disposed in the to-be-charged device, so that two or more wireless charging technologies that are not compatible with each other are supported. This can optimize a circuit design and improve charging flexibility. In addition, a current is split by using more than two receive channels. This can reduce a heating power of a circuit. Therefore, power transmission efficiency is improved.

With reference to the first aspect, in a possible implementation, the first receiving coil and the second receiving coil share a same magnetic shielding material on a flexible printed circuit FPC.

Two or more coils are disposed on a same FPC, and the coils share a same magnetic shielding material, so that the to-be-charged device can support two or more wireless charging technologies when an area of the magnetic shielding material or an overall device thickness is not increased or slightly increased. This optimizes a circuit design.

With reference to the first aspect, in a possible implementation, disposition of the first receiving coil and the second receiving coil in the FPC meets any one of the following conditions: the second receiving coil is disposed on the periphery of the first receiving coil; the first receiving coil and the second receiving coil are disposed in parallel; or the first receiving coil and the second receiving coil have a laminated structure.

With reference to the first aspect, in a possible implementation, the to-be-charged device further includes: a first receiving circuit, configured to receive, based on the first wireless charging technology, an alternating current signal sent by the first receiving coil, and convert the alternating current signal into a direct current; and a second receiving circuit, configured to receive, based on the second wireless charging technology, an alternating current signal sent by the second receiving coil, and convert the alternating current signal into a direct current.

With reference to the first aspect, in a possible implementation, the to-be-charged device supports charging based on both the first wireless charging technology and the second wireless charging technology.

Two receiving coils and corresponding receiving circuits are disposed in the to-be-charged device, so that the to-be-charged device can support charging based on two wireless charging technologies, and can support charging based on any one of the wireless charging technologies. This optimizes a circuit design, and improves charging flexibility.

With reference to the first aspect, in a possible implementation, the first wireless charging technology includes any one of the following: electromagnetic induction, electromagnetic resonance, a radio wave, and electric field coupling.

With reference to the first aspect, in a possible implementation, the second wireless charging technology includes any one of the following: electromagnetic induction, electromagnetic resonance, a radio wave, and electric field coupling.

According to a second aspect, a wireless charging device is provided, including: a first transmitting coil, configured to convert an alternating current signal into an electromagnetic signal based on a first wireless charging technology and transmit the electromagnetic signal; and a second transmitting coil, configured to convert an alternating current signal into an electromagnetic signal based on a second wireless charging technology and transmit the electromagnetic signal, where the first wireless charging technology and the second wireless charging technology support different resonance frequency ranges.

The two transmitting coils that support different wireless charging technologies are disposed in the to-be-charged device, so that two or more wireless charging technologies that are not compatible with each other are supported. This can optimize a circuit design and improve charging flexibility. In addition, a current is split by using more than two transmit channels. This can reduce a heating power of a circuit. Therefore, power transmission efficiency is improved.

With reference to the second aspect, in a possible implementation, the first transmitting coil and the second transmitting coil share a same magnetic shielding material on a flexible printed circuit FPC.

Two or more coils are disposed on a same FPC, and the coils share a same magnetic shielding material, so that the wireless charging device can support two or more wireless charging technologies when an area of the magnetic shielding material or an overall device thickness is not increased or slightly increased. This optimizes a circuit design.

With reference to the second aspect, in a possible implementation, disposition of the first transmitting coil and the second transmitting coil in the FPC meets any one of the following conditions: the second transmitting coil is disposed on the periphery of the first transmitting coil; the first transmitting coil and the second transmitting coil are disposed in parallel; or the first transmitting coil and the second transmitting coil have a laminated structure.

With reference to the second aspect, in a possible implementation, the wireless charging device further includes: a first transmitting circuit, configured to convert a direct current into an alternating current signal based on the first wireless charging technology, and transmit the alternating current signal to the first transmitting coil; and a second transmitting circuit, configured to convert a direct current into an alternating current signal based on the second wireless charging technology, and transmit the alternating current signal to the second transmitting coil.

With reference to the second aspect, in a possible implementation, the wireless charging device supports charging based on both the first wireless charging technology and the second wireless charging technology.

With reference to the second aspect, in a possible implementation, the first wireless charging technology includes any one of the following: electromagnetic induction, electromagnetic resonance, a radio wave, and electric field coupling.

With reference to the second aspect, in a possible implementation, the second wireless charging technology includes any one of the following: electromagnetic induction, electromagnetic resonance, a radio wave, and electric field coupling.

According to a third aspect, a flexible printed circuit FPC is provided. The FPC is used in a wireless charging system and includes: a first coil, configured to receive or send an electromagnetic signal based on a first wireless charging technology; and a second coil, configured to receive or send an electromagnetic signal based on a second wireless charging technology, where the first wireless charging technology and the second wireless charging technology support different resonance frequency ranges.

The two coils that support different wireless charging technologies are disposed in the FPC, so that two or more wireless charging technologies that are not compatible with each other are supported. This can optimize a circuit design and improve charging flexibility. In addition, a current is split by using more than two receive channels or transmit channels. This can reduce a heating power of a circuit. Therefore, power transmission efficiency is improved.

With reference to the third aspect, in a possible implementation, the first coil and the second coil share a same magnetic shielding material on the flexible printed circuit FPC.

With reference to the third aspect, in a possible implementation, disposition of the first coil and the second coil in the FPC meets any one of the following conditions: the second coil is disposed on the periphery of the first coil; the first coil and the second coil are disposed in parallel; or the first coil and the second coil have a laminated structure.

With reference to the third aspect, in a possible implementation, the first wireless charging technology includes any one of the following: electromagnetic induction, electromagnetic resonance, a radio wave, and electric field coupling.

With reference to the third aspect, in a possible implementation, the second wireless charging technology includes any one of the following: electromagnetic induction, electromagnetic resonance, a radio wave, and electric field coupling.

According to a fourth aspect, a wireless charging system is provided, including the to-be-charged device according to any one of the first aspect or the possible implementations of the first aspect, and the wireless charging device according to any one of the second aspect or the possible implementations of the second aspect.

DESCRIPTION OF EMBODIMENTS

The following describes the technical solutions in this application with reference to the accompanying drawings.

Several terms related to embodiments of this application are first described.

Wireless charging refers to a manner of performing charging by using an electromagnetic induction principle. A wireless charging system includes a transmit end and a receive end. The transmit end converts electric energy into an electromagnetic wave and transmits the electromagnetic wave in space. The receive end receives the electromagnetic wave and converts energy of the electromagnetic wave into electric energy, to finally implement wireless charging. Common wireless charging manners include electromagnetic induction, electromagnetic resonance, a radio wave, electric field coupling, and the like.

The Qi standard is a wireless charging standard. A communications protocol of the Qi standard uses frequency shift keying (frequency shift keying, FSK) and amplitude shift keying (amplitude shift keying, ASK). The Qi standard uses electromagnetic induction, and is usually applied to mobile phones, tablet computers, portable computers, cameras, or other electronic products.

The A4WP standard is a wireless charging standard. A communications protocol of the A4WP standard uses a Bluetooth low energy (Bluetooth low energy, BLE) technology. The A4WP standard uses electromagnetic resonance, and may be applied to fields such as portable electronic products or electric vehicles.

Electromagnetic induction is a wireless charging technology, is also referred to as an electromagnetic induction technology, and refers to a charging manner in which a varying current in a primary coil passes through the coil to generate a varying magnetic field, and an induced electromotive force is generated with respect to a close-coupled secondary coil, so that power transmission of wireless charging is implemented. The electromagnetic induction technology has high conversion efficiency, but is suitable for only a relatively short transmission distance.

Electromagnetic resonance is a wireless charging technology, is also referred to as an electromagnetic resonance technology, near-field resonance, or magnetic field resonance, and refers to a manner of transmitting electric energy by using a resonance effect. Energy transmission can be implemented when a transmit end and a receive end resonate at a specific frequency. The electromagnetic resonance technology is suitable for charging at a medium/short distance.

A radio wave is a wireless charging technology, is also referred to as a radio wave technology or a radio frequency microwave, and means that a transmit end transmits energy in an electromagnetic wave form, and a receive end receives the energy by using an antenna and then rectifies the energy, to implement electric energy transmission.

Electric field coupling is a wireless charging technology, and is also referred to as an electric field coupling technology. A principle of the electric field coupling is as follows: Based on inductance coupling, when two coils that are relatively close to each other are magnetized, a magnetic field is generated, and after another coil senses the magnetic field, a magnetic induced current is generated, so that electric energy transmission is implemented.

A flexible printed circuit (flexible printed circuit, FPC) is also referred to as a soft printed circuit, and is a printed circuit with high reliability and flexibility. A bendable flexible circuit is formed by embedding a circuit design and a precision element on a bendable plastic sheet. The FPC can be used to manufacture a coil in a wireless charging system. The coil manufactured by using the FPC may be referred to as an FPC coil.

A magnetic shielding material, or referred to as a magnetic shielding sheet, is a magnetic material, has a magnetic conduction function, a magnetic shielding function, and a thermal conduction function, and can be used to manufacture an FPC coil. The magnetic shielding material can play a role in magnetic shielding and magnetic conduction for resistance reduction. Common magnetic shielding materials may include a soft magnetic ferrite, a metal powder compound, an amorphous soft magnetic alloy, a nano-crystal soft magnetic alloy, and the like.

Figure 1:
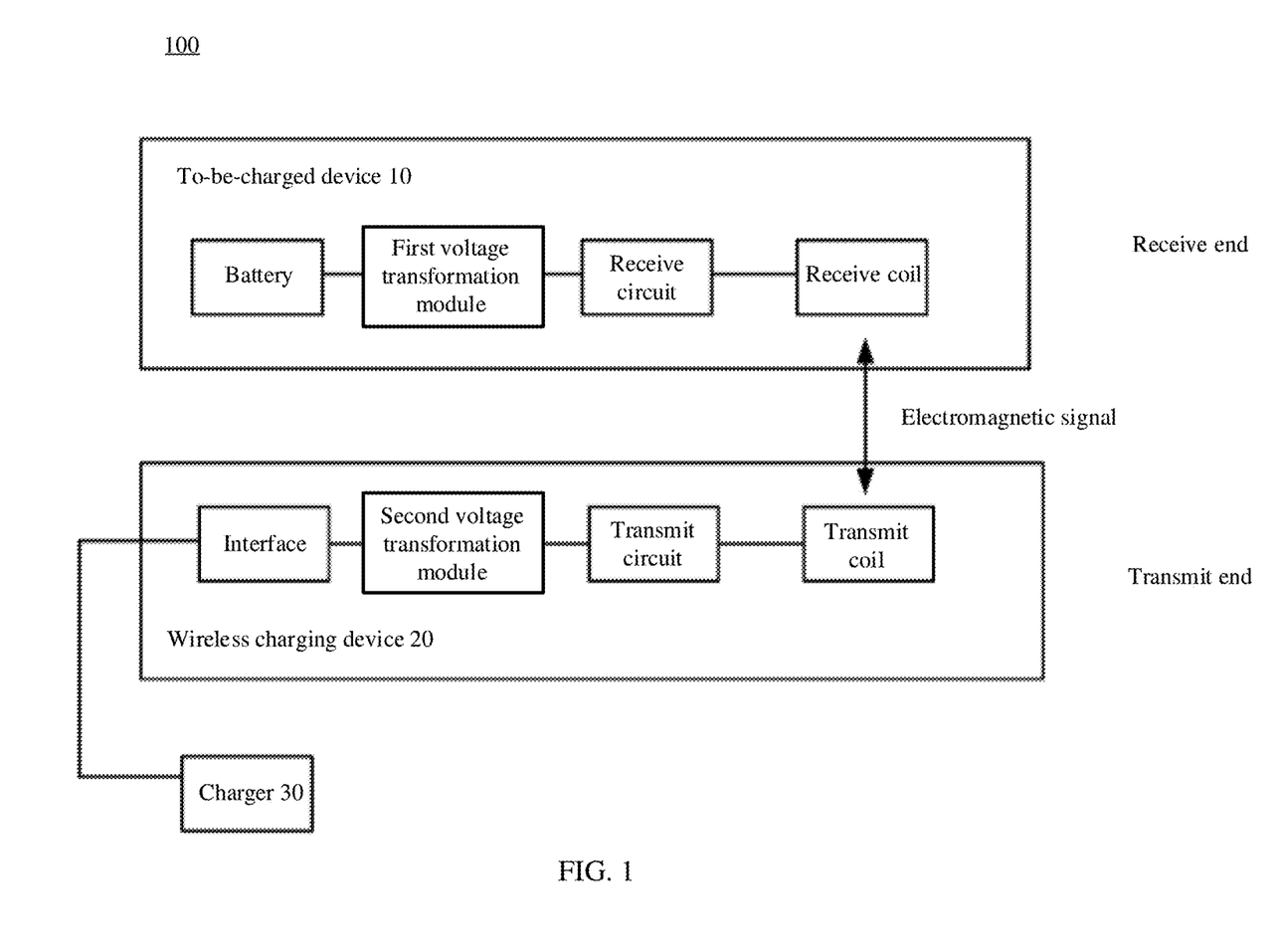
FIG. 1 is a schematic diagram of an application scenario of a wireless charging system 100 according to an embodiment of this application.

FIG. 1 is a schematic diagram of an application scenario of a wireless charging system 100 according to an embodiment of this application. As shown in FIG. 1, the system 100 includes a to-be-charged device 10, a wireless charging device 20, and a charger 30.

The charger 30 is connected to the wireless charging device 20. The charger 30 may be configured to receive mains power, convert the mains power into a direct current, and output the direct current to the wireless charging device 20. The wireless charging device 20 is configured to convert received electric energy into an electromagnetic signal and transmit the electromagnetic signal. The to-be-charged device 10 is configured to receive the electromagnetic signal and convert the electromagnetic signal into electric energy, to implement wireless charging.

In a wireless charging scenario, the wireless charging device 20 may be referred to as a transmit end, and the to-be-charged device 10 may be referred to as a receive end.

As shown in FIG. 1, the wireless charging device 20 includes an interface, a second voltage transformation module, a transmitting circuit, and a transmitting coil. The interface is configured to be connected to the charger 30 to receive a direct current that is input by the charger 30. The second voltage transformation module is configured to implement voltage transformation, the transmitting circuit is configured to convert the direct current into an alternating current signal, and the transmitting coil is configured to convert the alternating current signal into an electromagnetic signal and transmit the electromagnetic signal.

As shown in FIG. 1, the to-be-charged device 10 includes a battery, a first voltage transformation module, a receiving circuit, and a receiving coil. The receiving coil is configured to receive an electromagnetic signal and convert the electromagnetic signal into an alternating current signal, the receiving circuit is configured to convert the alternating current signal into a direct current, the first voltage transformation module is configured to implement voltage transformation, and the battery is configured to store electric energy.

Optionally, the scenario in FIG. 1 may alternatively include no charger, and a rectification module may be integrated into the wireless charging device, to implement a function of converting mains power into a direct current, so that the wireless charging device can directly receive the mains power. In some examples, the wireless charging device may alternatively be directly connected to a storage battery, to receive a direct current as an input.

In some examples, the to-be-charged device 10 may include but is not limited to a terminal device, a smartphone, a tablet computer, a wearable device, a vehicle-mounted device, an electric vehicle, or the like. The wireless charging device 20 includes but is not limited to a wireless charging socket or another device configured to provide a wireless charging function.

It should be understood that different wireless charging technologies have different charging principles or support different resonance frequency ranges. Therefore, different transmitting circuits and transmitting coils and different receiving circuits and receiving coils need to be designed for different wireless charging technologies. The wireless charging system 100 in FIG. 1 includes one transmitting circuit and one receiving circuit, and can support only single-mode charging. As wireless charging requirements increase, a single-mode charging manner encounters many problems. For example, as a charging voltage continuously increases (for example, when the charging voltage is greater than 20 V), a cascading circuit needs to be added inside the to-be-charged device. This causes a decrease in system efficiency and an increase in a transmit power, and further limits an increase in a wireless charging power. In addition, as a charging current increases, a limit of a coil technology needs to be constantly challenged, to decrease a direct-current resistance (direct-current resistance, DCR) and an alternating-current resistance (alternating-current resistance, ACR) of a coil. The technology is difficult to improve, resulting in a bottleneck of a charging power.

For the foregoing problem, an embodiment of this application provides a wireless charging solution. The solution can support two or more wireless charging technologies, and can implement relatively good compatibility. In this solution, a transmit end includes a plurality of transmitting circuits and a plurality of transmitting coils. A receive end includes a plurality of receiving circuits and a plurality of receiving coils. This solution can be compatible with a plurality of wireless charging solutions, thereby improving wireless charging flexibility. In addition, a current is split by using more than two transmit channels or receive channels. This can reduce a heating power of a circuit. Therefore, a bottleneck problem that a charging power cannot be increased due to an excessively high heating power of a coil is resolved, power transmission efficiency is improved, and a transmit power is increased.

A wireless charging solution in embodiments of this application is described below by using an example in which a transmit end includes two transmitting circuits and a receive end includes two receiving circuits.

Figure 2:
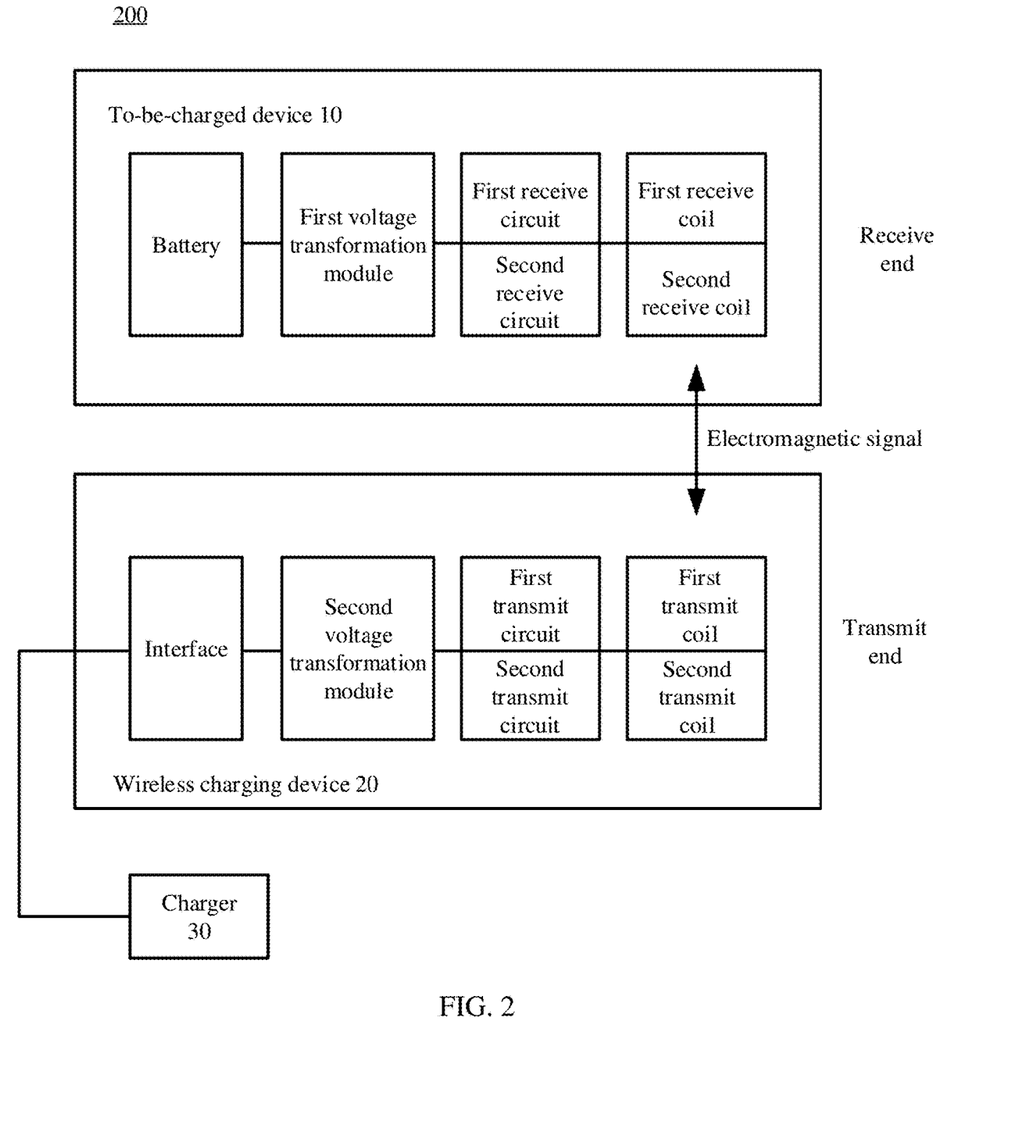
FIG. 2 is a schematic diagram of an application scenario of a wireless charging system 200 according to an embodiment of this application.

FIG. 2 is a schematic diagram of an application scenario of a wireless charging system 200 according to another embodiment of this application. As shown in FIG. 2, a to-be-charged device 10 includes a battery, a first voltage transformation module, two receiving circuits, and two receiving coils. The two receiving circuits and the two receiving coils are in a one-to-one correspondence. The two receiving circuits include a first receiving circuit and a second receiving circuit, and the two receiving coils include a first receiving coil and a second receiving coil.

The first receiving coil and the first receiving circuit are corresponding to a first wireless charging technology, and the second receiving coil and the second receiving circuit are corresponding to a second wireless charging technology. The first wireless charging technology and the second wireless charging technology support different resonance frequency ranges, or the first wireless charging technology and the second wireless charging technology have different wireless charging principles. In other words, the first wireless charging technology and the second wireless charging technology are not compatible in hardware.

It should be understood that different resonance frequency ranges in this application may refer to different start points of two resonance frequency ranges, different end points of two resonance frequency ranges, or different start points and different end points of two resonance frequency ranges.

It should be understood that different resonance frequency ranges in this application may include a case in which the resonance frequency ranges partially overlap.

It should be understood that for different resonance frequency ranges in this application, a specific measurement error is allowed, and the error may be determined according to the practice.

By way of example but not limitation, the first wireless charging technology includes any one of the following: electromagnetic induction, electromagnetic resonance, a radio wave, and electric field coupling.

By way of example but not limitation, the second wireless charging technology includes any one of the following: electromagnetic induction, electromagnetic resonance, a radio wave, and electric field coupling.

Optionally, the first wireless charging technology and the second wireless charging technology may be based on a same wireless charging principle. For example, both the first wireless charging technology and the second wireless charging technology are any one of the following: electromagnetic induction, electromagnetic resonance, a radio wave, and electric field coupling.

Optionally, the first wireless charging technology and the second wireless charging technology may be based on different wireless charging principles. For example, the first wireless charging technology and the second wireless charging technology are any two of the following: electromagnetic induction, electromagnetic resonance, a radio wave, and electric field coupling.

Optionally, the first wireless charging technology and the second wireless charging technology may be based on different wireless charging standards. For example, the first wireless charging technology and the second wireless charging technology are any two of the following: the Qi standard, the A4WP standard, the PMA standard, the Wi-Po standard, and the iNPOFi standard.

The first receiving coil is configured to receive an electromagnetic signal based on the first wireless charging technology, and convert the electromagnetic signal into an alternating current signal. The first receiving circuit is configured to receive, based on the first wireless charging technology, the alternating current signal sent by the first receiving coil, and convert the alternating current signal into a direct current. The second receiving coil is configured to receive an electromagnetic signal based on the second wireless charging technology, and convert the electromagnetic signal into an alternating current signal. The second receiving circuit is configured to receive, based on the second wireless charging technology, the alternating current signal sent by the second receiving coil, and convert the alternating current signal into a direct current.

Still with reference to FIG. 2, a wireless charging device 20 includes an interface, a second voltage transformation module, two transmitting circuits, and two transmitting coils. The two transmitting circuits and the two transmitting coils are in a one-to-one correspondence. The two transmitting circuits include a first transmitting circuit and a second transmitting circuit, and the two transmitting coils include a first transmitting coil and a second transmitting coil.

The first transmitting coil and the first transmitting circuit are corresponding to the first wireless charging technology, and the second transmitting coil and the second transmitting circuit are corresponding to the second wireless charging technology.

The first transmitting coil is configured to convert an alternating current signal into an electromagnetic signal based on the first wireless charging technology, and transmit the electromagnetic signal. The first transmitting circuit is configured to convert a direct current into an alternating current signal based on the first wireless charging technology, and transmit the alternating current signal to the first transmitting coil. The second transmitting coil is configured to convert an alternating current signal into an electromagnetic signal based on the second wireless charging technology, and transmit the electromagnetic signal. The second transmitting circuit is configured to convert a direct current into an alternating current signal based on the second wireless charging technology, and transmit the alternating current signal to the second transmitting coil.

Optionally, the first voltage transformation module and the second voltage transformation module may be modules that can implement a voltage transformation function. By way of example but not limitation, the first voltage transformation module and the second voltage transformation module each may include at least one of the following: a switched capacitor (switched capacitor, SC) converter, a boost (boost) circuit, a buck (buck) circuit, and a buck-boost (buck-boost) circuit.

In some examples, in the wireless charging device 20, the second voltage transformation module receives a direct current through the interface, then performs voltage transformation on the direct current, and outputs a transformed direct current to a transmitting circuit (the first transmitting circuit or the second transmitting circuit). The transmitting circuit is configured to convert the direct current into an alternating current signal, and transmit the alternating current signal to a corresponding transmitting coil, so that the transmitting coil converts the alternating current signal into an electromagnetic signal, to transmit the electromagnetic signal to the to-be-charged device 10.

In some examples, in the to-be-charged device 10, the receiving coil (the first receiving coil or the second receiving coil) is configured to receive an electromagnetic signal, convert the electromagnetic signal into an alternating current signal, and transmit the alternating current signal to a corresponding receiving circuit (the first receiving circuit or the second receiving circuit). The receiving circuit is configured to convert the alternating current signal into a direct current, and output the direct current to the first voltage transformation module. The first voltage transformation module is configured to perform voltage transformation on the direct current, and then output electric energy to the battery for charging.

Optionally, the wireless charging system 200 may work in a single-mode charging mode or a dual-mode charging mode. The single-mode charging mode means that the wireless charging system 200 performs charging based on the first wireless charging technology or the second wireless charging technology. The dual-mode charging mode means that the wireless charging system 200 performs charging based on both the first wireless charging technology and the second wireless charging technology.

Optionally, the first receiving coil and the second receiving coil share a same magnetic shielding material on an FPC. Optionally, disposition of the first receiving coil and the second receiving coil in the FPC meets any one of the following conditions: the second receiving coil is disposed on the periphery of the first receiving coil; the first receiving coil and the second receiving coil are disposed in parallel; or the first receiving coil and the second receiving coil have a laminated structure.

The laminated structure may be a structure in which the FPC includes two or more layers, and the first receiving coil and the second receiving coil are disposed at different layers.

Optionally, the first receiving coil and the second receiving coil may alternatively use different magnetic shielding materials on a same FPC.

Optionally, the first transmitting coil and the second transmitting coil share a same magnetic shielding material on a flexible printed circuit FPC. Disposition of the first transmitting coil and the second transmitting coil in the FPC meets any one of the following conditions: the second transmitting coil is disposed on the periphery of the first transmitting coil; the first transmitting coil and the second transmitting coil are disposed in parallel; or the first transmitting coil and the second transmitting coil have a laminated structure.

The laminated structure may be a structure in which the FPC includes two or more layers, and the first transmitting coil and the second transmitting coil are disposed at different layers.

Optionally, the first transmitting coil and the second transmitting coil may alternatively use different magnetic shielding materials on a same FPC.

Figure 3:
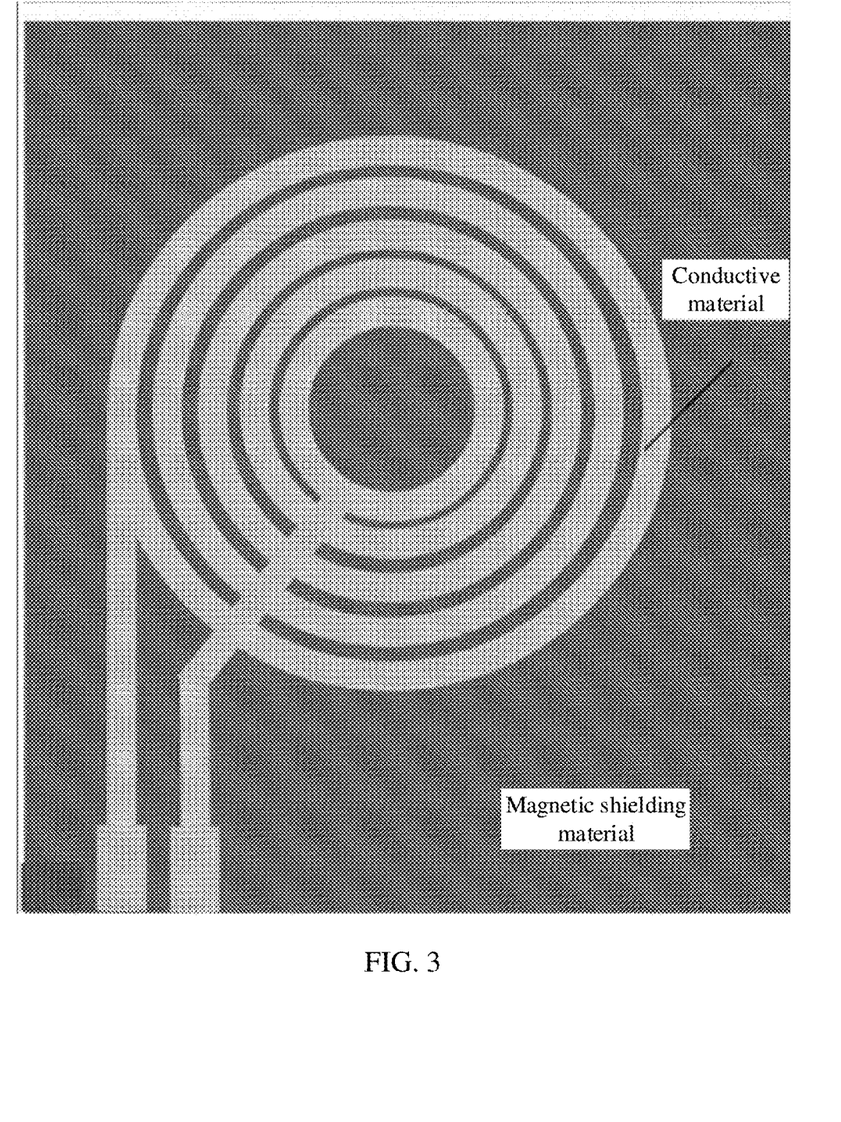
FIG. 3 is a schematic diagram of a coil design that supports a single-mode charging mode according to an embodiment of this application.
Figure 4:
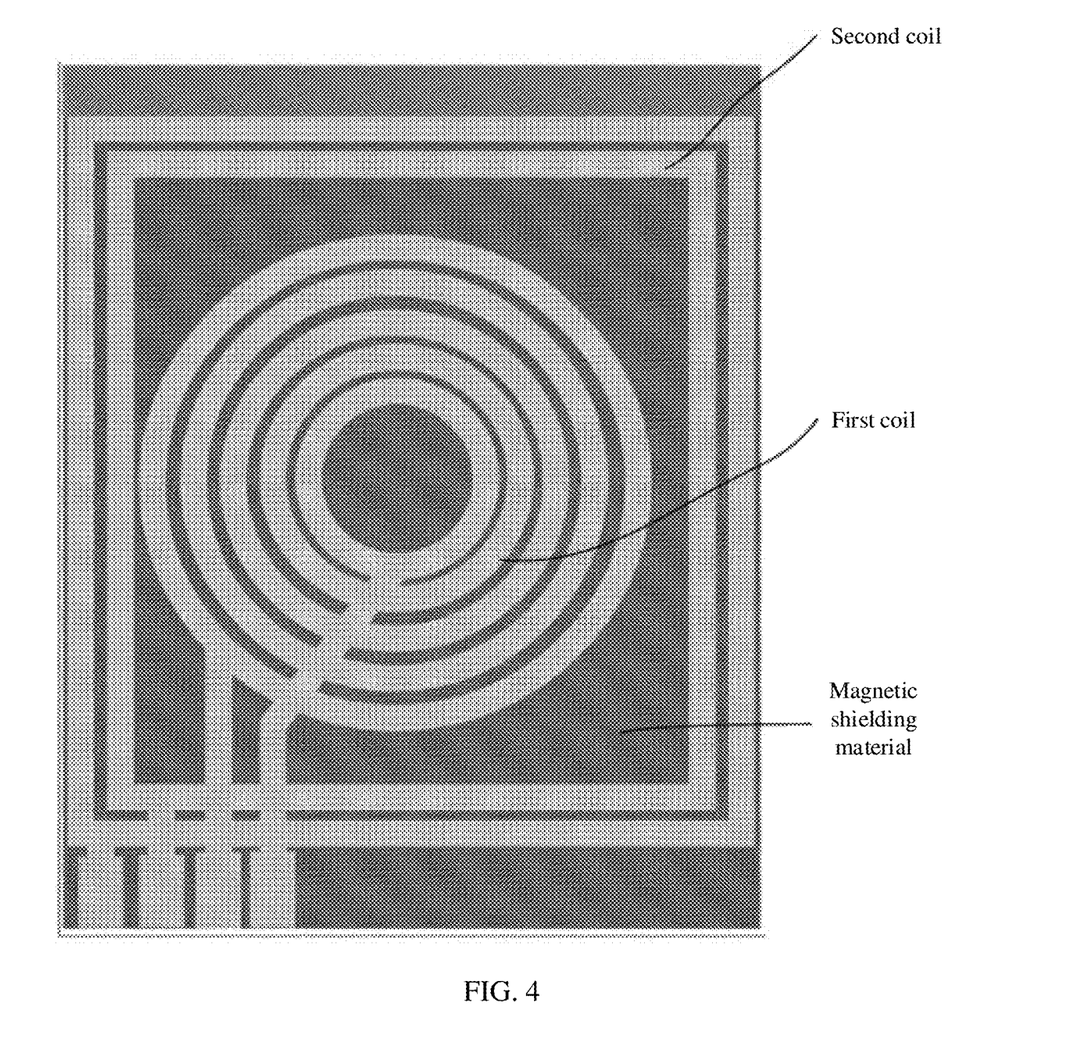
FIG. 4 is a schematic diagram of a coil design that supports a dual-mode charging mode according to an embodiment of this application.

FIG. 3 and FIG. 4 each are a schematic diagram of a coil design according to an embodiment of this application. FIG. 3 shows a coil design solution that corresponds to FIG. 1 and that supports a single-mode charging mode, and FIG. 4 shows a coil design solution that corresponds to FIG. 2 and that supports a dual-mode charging mode.

It should be noted that the solutions in FIG. 3 and FIG. 4 may be applied to both a transmit end and a receive end. Therefore, a transmitting coil and a receiving coil are collectively referred to as coils. The following first coil may be a first transmitting coil or a first receiving coil.

The following second coil may be a second transmitting coil or a second receiving coil.

As shown in FIG. 3, the coil may be disposed on an FPC, and includes a magnetic shielding material and a conductor material disposed on the FPC. In the single-mode charging mode, only one coil is required on the FPC.

As shown in FIG. 4, in the dual-mode charging mode, two coils may be disposed on the FPC, and the two coils may share a same magnetic shielding material. The second coil is disposed on the periphery of the first coil. Because the two coils reuse the magnetic shielding material and the FPC, area utilization of the magnetic shielding material can be improved, and an overall device thickness of a to-be-charged device can be not increased or slightly increased.

The foregoing two coils may support resonance frequency ranges and inductance amounts in different wireless charging technologies, and work independently.

In an example, if the first coil supports the Qi standard, a resonance frequency range supported by the first coil is 100 KHz to 205 KHz. If the second coil supports the A4WP standard, a resonance frequency range supported by the second coil is 6.765 MHz to 6.795 MHz.

Optionally, similar to that in FIG. 4, when more than two coils are disposed at a transmit end or a receive end, it may be specified that a plurality of coils share a magnetic shielding material and an FPC. Details are not described herein.

In this embodiment of this application, two or more coils are disposed on a same FPC, and the coils share a same magnetic shielding material, so that a wireless charging system can support two or more wireless charging technologies when an area of the magnetic shielding material or an overall device thickness is not increased or slightly increased. This can optimize a circuit design and improve charging flexibility. In addition, a current is split by using more than two transmit channels and receive channels. This can reduce a heating power of a circuit. Therefore, power transmission efficiency is improved, and a transmit power can be increased.

Figure 5:
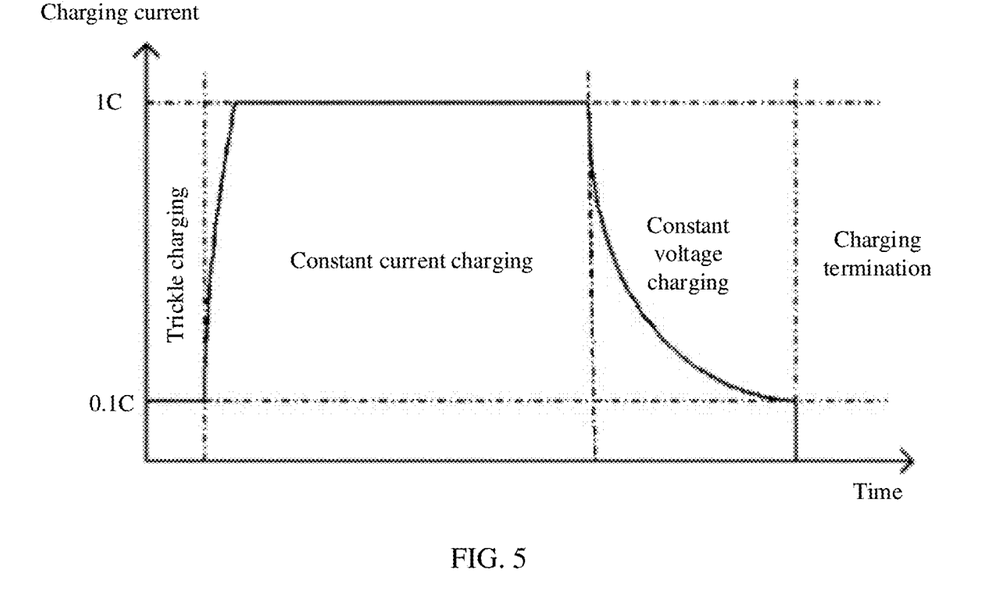
FIG. 5 is a schematic diagram of a battery charging process according to an embodiment of this application.

To facilitate understanding of a working principle of a charging mode, the following first describes a principle of a battery charging process with reference to FIG. 5.

FIG. 5 is a schematic diagram of a battery charging process according to an embodiment of this application. The vertical coordinate represents a charging current, and the horizontal coordinate represents time. As shown in FIG. 5, the battery charging process usually includes four phases: trickle charging, constant current (constant current, CC) charging, constant voltage (constant voltage, CV) charging, and charging termination. Definitions of the phases are as follows:

The trickle charging means that a fully discharged battery is precharged at the beginning of charging. In a trickle charging process, a voltage of a to-be-charged battery may be first detected. If the voltage is lower than a first preset voltage $V_1$, precharging needs to be performed. A current of the trickle charging is usually one tenth of a constant current charging current, that is, 0.1C. 1C represents the current of the constant current charging. After the battery voltage is higher than the first preset voltage $V_1$, a constant current charging process is entered.

The constant current charging refers to a phase in which a charging current is constant. In the constant current charging phase, the voltage of the battery continuously increases until the voltage reaches a second preset voltage $V_2$, and then a constant voltage charging phase is entered.

The constant voltage charging refers to a phase in which a charging voltage is constant. In a constant voltage charging process, the charging current continuously decreases.

The charging termination means that after the charging current decreases to a specific range, for example, decreases to 0.1 C, charging stops.

It should be noted that the preset voltages $V_1$ and $V_2$ may be determined according to the practice. This is not limited in this application. For example, a lithium battery is used as an example, $V_1$=3 V, and $V_2$=4.2 V.

The following describes two charging working modes of the wireless charging system 200 in FIG. 2, that is, a single-mode charging mode and a dual-mode charging mode. The wireless charging system 200 may work in the single-mode charging mode or the dual-mode charging mode. The single-mode charging mode means that the wireless charging system 200 performs charging based on the first wireless charging technology or the second wireless charging technology. The dual-mode charging mode means that the wireless charging system 200 performs charging based on both the first wireless charging technology and the second wireless charging technology.

(A) Single-Mode Charging Mode

In a single-mode working state, the wireless charging system 200 performs charging based on a receiving circuit (and a transmitting circuit) and a receiving coil (and a transmitting coil) corresponding to only one of the wireless charging technologies, and a receiving circuit (and a transmitting circuit) and a receiving coil (and a transmitting coil) corresponding to the other wireless charging technology may not work.

(B) Dual-Mode Charging Mode

In a dual-mode working state, the wireless charging system 200 may perform charging based on the two wireless charging technologies. However, in the dual-mode charging mode, the following exceptions need to be considered.

(1) If a to-be-charged device is in an off state, charging is first performed based on the first wireless charging technology, and the to-be-charged device is awakened. Then, after fast boot (fast boot) of the system, the second wireless charging technology is enabled, and charging work is implemented based on the two wireless charging technologies.

(2) When a voltage of a battery of the to-be-charged device is lower than a preset voltage threshold $V_t$, the battery cannot withstand charging with a high current. Therefore, charging may be first performed based on the first wireless charging technology. After the battery voltage is higher than $V_t$, the second wireless charging technology is enabled, and charging work is implemented based on the two wireless charging technologies. The preset voltage threshold $V_t$ may be determined according to the practice. This is not limited in embodiments of this application. For example, the preset voltage threshold $V_t$ may be 3.5 V.

(3) After battery charging enters a constant voltage charging phase, when a current decreases and is lower than a preset current threshold $I_t$, a charging channel corresponding to the second wireless charging technology may be disabled, and a charging channel corresponding to only the first wireless charging technology is reserved. The charging channel may refer to a receiving coil and a receiving circuit corresponding to a corresponding wireless charging technology. The preset current threshold may be determined according to the practice. For example, the preset current threshold $I_t$ is 1 A.

Figure 6:
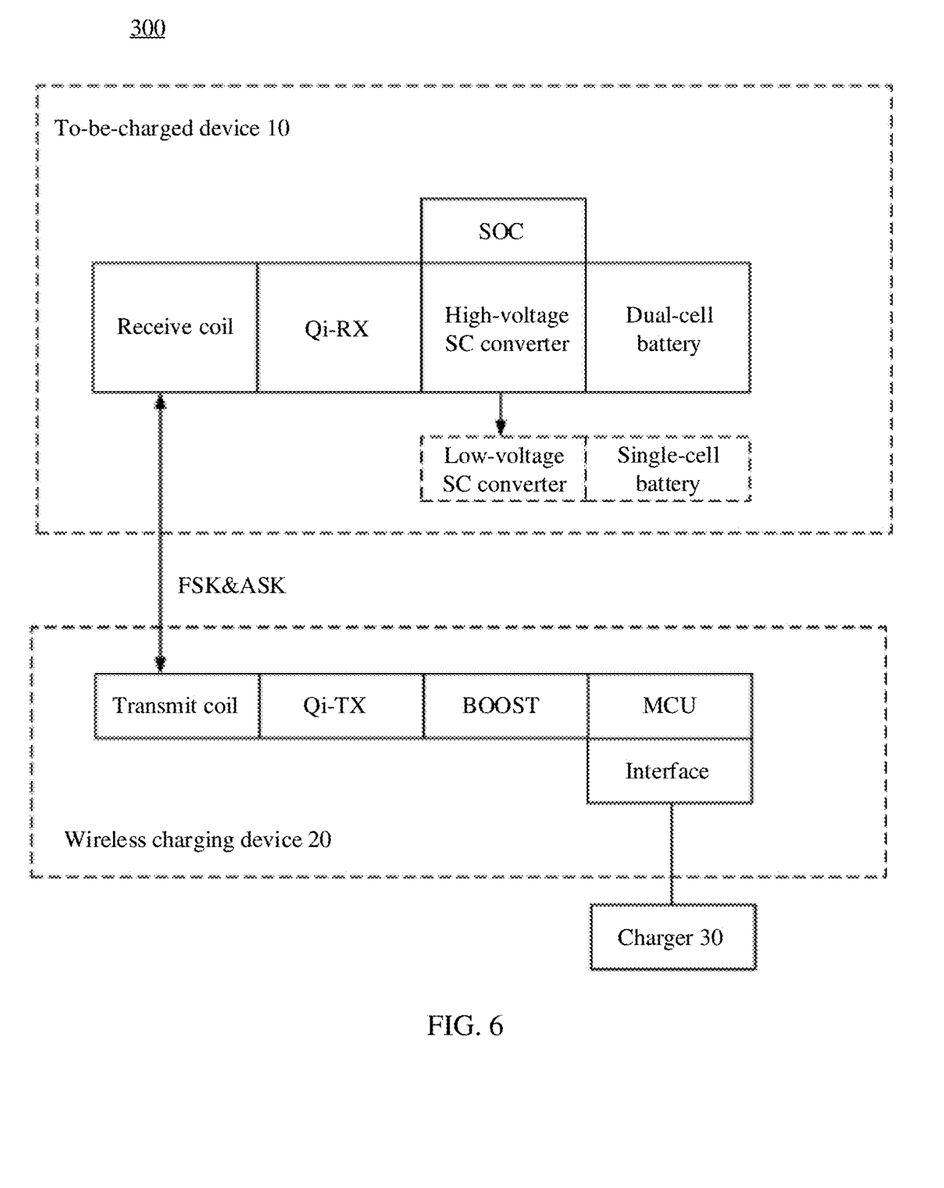
FIG. 6 is a schematic diagram of a scenario of a wireless charging system 300 according to an embodiment of this application.

FIG. 6 is a schematic diagram of a scenario of a wireless charging system 300 according to an embodiment of this application. The wireless charging system 300 in FIG. 6 supports only a single-mode charging mode, and an example in which a wireless charging technology supported by the single-mode charging mode is the Qi standard is used for description.

As shown in FIG. 6, in the wireless charging system 300, a to-be-charged device 10 includes a receiving coil, a receiving circuit supporting the Qi standard (that is, Qi-RX), a first voltage transformation module (which is a low-voltage SC converter or a high-voltage SC converter in the figure), a system on a chip (system on a chip, SOC), and a battery (which is a battery including two cells connected in series or a single-cell battery in the figure). As shown in FIG. 6, if the battery is the single-cell battery, the first voltage transformation module may be the low-voltage SC converter. If the battery is the battery including two cells connected in series, the first voltage transformation module may be a high-voltage SC converter. The low-voltage SC converter means that an output voltage of the low-voltage SC converter is equal to a battery voltage. The high-voltage SC converter means that an output voltage of the high-voltage SC converter is two or more times as high as a battery voltage.

As shown in FIG. 6, a wireless charging device 20 includes a transmitting coil, a transmitting circuit supporting the Qi standard (that is, Qi-TX), a second voltage transformation module, a microcontroller unit (microcontroller unit, MCU), and an interface. The second voltage transformation module includes a boost (boost) circuit in FIG. 6.

Figure 7:
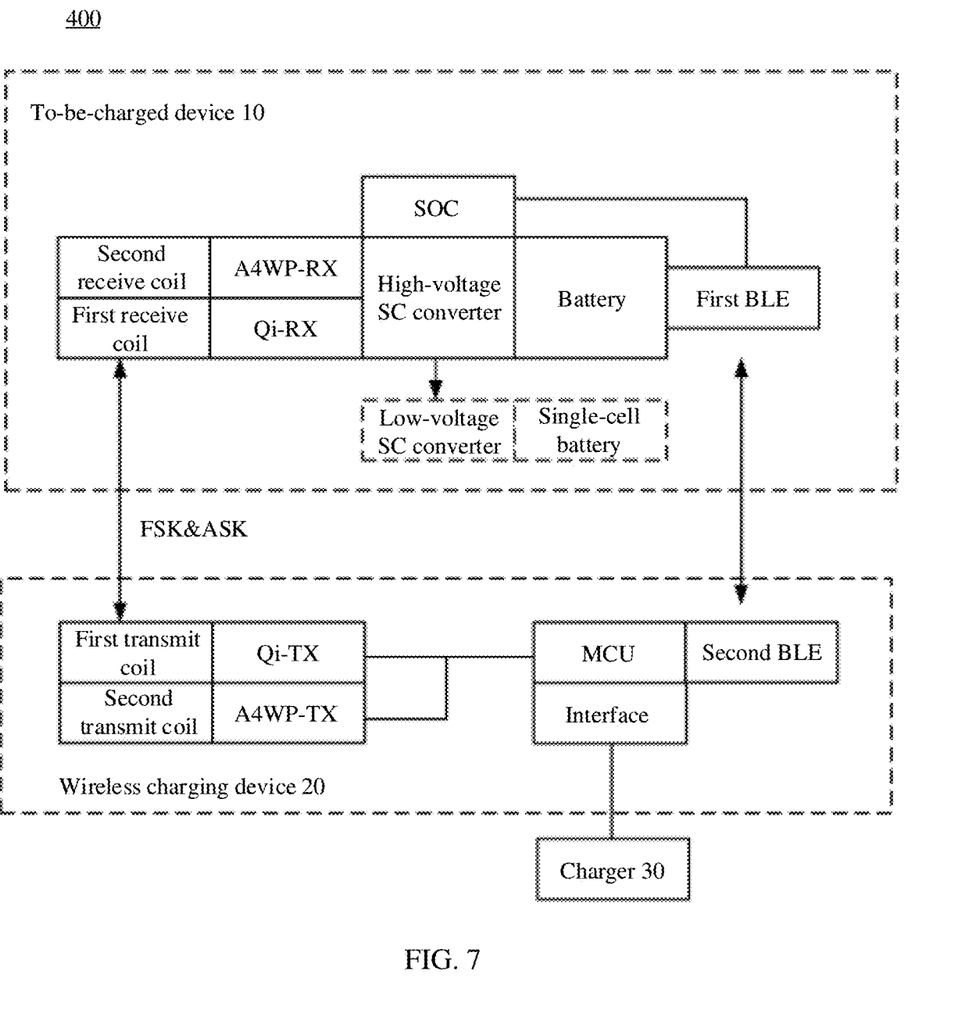
FIG. 7 is a schematic diagram of a scenario of a wireless charging system 400 according to an embodiment of this application.

FIG. 7 is a schematic diagram of a scenario of a wireless charging system 400 according to an embodiment of this application. The wireless charging system 400 in FIG. 7 supports a dual-mode charging mode, and an example in which the dual-mode charging mode supports the Qi standard and the A4WP standard is used for description.

With reference to FIG. 6 and FIG. 7, it can be learned that in the wireless charging system 400, a second receiving coil, a receiving circuit supporting the A4WP standard (A4WP-RX), and a first BLE module supporting BLE are added to the to-be-charged device 10. BLE is a communications protocol in the A4WP standard, and the first BLE module and the following second BLE module are configured to implement communication between the to-be-charged device 10 and the wireless charging device 20.

In an example of the wireless charging device 20, a second transmitting coil, a transmitting circuit supporting the A4WP standard (that is, A4WP-TX), and the second BLE module are added.

In addition, in the wireless charging device 20, a boost (boost) circuit may further be reduced. The wireless charging device 20 uses the second BLE module, and the second BLE module can communicate with a charger 30. BLE communication is relatively real-time and anti-interference, and a voltage that is output by the charger 30 can be controlled (or adjusted) in real time, so that the boost circuit in the wireless charging device 20 is omitted. This can simplify a circuit and improve link efficiency.

In embodiments of this application, a transmitting circuit and a receiving circuit are added to a wireless charging system, so that a heat loss can be reduced, and power transmission efficiency can be improved.

A receiving coil is used as an example. An alternating-current resistance (ACR) of a receiving coil corresponding to the Qi standard is 250 mΩ (milliohm), and an ACR of a receiving coil corresponding to the A4WP standard is 150 mΩ.

In a single-mode charging state, if an equivalent current passing through the receiving coil is 1.5 A, according to Joule's law, a heating power of the coil is:

$$P = I^2 \times R = 562.5 \text{ mW} \quad (1)$$

Herein, P represents the heating power, I represents the current, and R represents the alternating-current resistance (ACR) of the coil.

In a dual-mode charging state, if an equivalent current passing through the coil is 1.5 A, an equally divided current on each charging channel is 0.75 A. In this case, overall heat of the coil is:

$$P = P1 + P2 = 0.75 \times 0.75 \times 250 + 0.75 \times 0.75 \times 150 = 225 \text{ mW} \quad (2)$$

Herein, P1 represents a heating power of the receiving coil corresponding to the Qi standard. P2 represents a heating power of the receiving coil corresponding to the A4WP standard.

It can be learned through comparison between the formula (1) and the formula (2) that, compared with the single-mode charging state, the dual-mode charging state reduces approximately half heat loss with respect to a same current. Likewise, on a board-level input channel, approximately half heat loss can be reduced. Therefore, the wireless charging solution in embodiments of this application can reduce a heating power and improve charging efficiency.

In addition, in embodiments of this application, because two receiving circuits are disposed in the to-be-charged device 10, a local heat source can be dispersed, and a heat dissipation capability of the entire device can be improved. For example, assuming that efficiency of the receiving circuit is 95%, during output of 20 W, a heat loss power of a single receiving circuit is about 1 W, and a local heat source is formed. When two receiving circuits work synchronously, each receiving circuit needs to output a power of only 10 W, and a heat loss power of each receiving circuit is 500 mW, so that a heat source is dispersed. Therefore, with respect to a same power, a dual-receiving circuit or multi-receiving circuit solution can disperse a local heat source and improve a heat dissipation capability. Similarly, in the wireless charging device 20, a same technical effect can be achieved by disposing two transmitting circuits or a plurality of transmitting circuits.

A person of ordinary skill in the art may be aware that the example units and algorithm steps described in embodiments disclosed in this specification can be implemented by electronic hardware or a combination of computer software and electronic hardware. Whether the functions are implemented by hardware or software depends on specific applications and design constraints of the technical solutions. A person skilled in the art may use different methods for each specific application to implement the described functions, but this implementation should not be considered to be beyond the scope of this application.

It may be clearly understood by a person skilled in the art that, for convenience and brevity of description, for a specific working process of the foregoing described system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division. In actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces, and indirect couplings or communication connections between apparatuses or units may be implemented in an electrical, mechanical, or another form.

The units described as separate parts may or may not be physically separate, and parts displayed as units may or may not be physical units, may be located in one place, or may be distributed on a plurality of network units. Some or all of the units may be selected according to an actual requirement to achieve the objectives of the solutions in the embodiments.

In addition, function units in embodiments of this application may be integrated into one processing unit, or each unit may exist alone physically, or two or more units may be integrated into one unit.

When the function is implemented in a form of a software function unit and sold or used as an independent product, the function may be stored in a computer-readable storage medium. Based on such an understanding, the technical solutions of this application essentially, or the part contributing to the conventional technology, or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application. However, the protection scope of this application is not limited thereto. Any change or replacement readily figured out by a person skilled in the art within the technical scope disclosed in this application shall fall within the protection scope of this application. Therefore, the protection scope of this application shall be subject to the protection scope of the claims.

What is claimed is:

1. A to-be-charged device, comprising:
  a first receiving coil, configured to receive an electromagnetic signal based on a first wireless charging technology, and convert the electromagnetic signal into an alternating current signal; and a second receiving coil, configured to receive an electromagnetic signal based on a second wireless charging technology, and convert the electromagnetic signal into an alternating current signal, wherein the first wireless charging technology and the second wireless charging technology support different resonance frequency ranges.

2. The to-be-charged device according to claim 1, wherein the first receiving coil and the second receiving coil share a same magnetic shielding material on a flexible printed circuit FPC.

3. The to-be-charged device according to claim 2, wherein the disposition of the first receiving coil and the second receiving coil in the FPC meets any one of the following conditions:

the second receiving coil is disposed on the periphery of the first receiving coil;

the first receiving coil and the second receiving coil are disposed in parallel; or the first receiving coil and the second receiving coil are in a laminated structure.

4. The to-be-charged device according to claim 1, further comprising:

a first receiving circuit, configured to receive, based on the first wireless charging technology, an alternating current signal sent by the first receiving coil, and convert the alternating current signal into a direct current; and a second receiving circuit, configured to receive, based on the second wireless charging technology, an alternating current signal sent by the second receiving coil, and convert the alternating current signal into a direct current.

5. The to-be-charged device according to claim 1, wherein the to-be-charged device supports being charged based on both the first wireless charging technology and the second wireless charging technology.

6. The to-be-charged device according to claim 1, wherein the first wireless charging technology comprises any one of the following:

electromagnetic induction, electromagnetic resonance, a radio wave, and electric field coupling.

7. The to-be-charged device according to claim 1, wherein the second wireless charging technology comprises any one of the following:

electromagnetic induction, electromagnetic resonance, a radio wave, and electric field coupling.

8. A wireless charging device, comprising:

a first transmitting coil, configured to convert an alternating current signal into an electromagnetic signal based on a first wireless charging technology and transmit the electromagnetic signal; and a second transmitting coil, configured to convert an alternating current signal into an electromagnetic signal based on a second wireless charging technology and transmit the electromagnetic signal, wherein the first wireless charging technology and the second wireless charging technology support different resonance frequency ranges.

9. The wireless charging device according to claim 8, wherein the first transmitting coil and the second transmitting coil share a same magnetic shielding material on a flexible printed circuit FPC.

10. The wireless charging device according to claim 9, wherein disposition of the first transmitting coil and the second transmitting coil in the FPC meets any one of the following conditions:

the second transmitting coil is disposed on the periphery of the first transmitting coil;

the first transmitting coil and the second transmitting coil are disposed in parallel; or the first transmitting coil and the second transmitting coil are in a laminated structure.

11. The wireless charging device according to claim 8, further comprising:

a first transmitting circuit, configured to convert a direct current into an alternating current signal based on the first wireless charging technology, and transmit the alternating current signal to the first transmitting coil; and a second transmitting circuit, configured to convert a direct current into an alternating current signal based on the second wireless charging technology, and transmit the alternating current signal to the second transmitting coil.

12. The wireless charging device according to claim 8, wherein the wireless charging device supports charging based on both the first wireless charging technology and the second wireless charging technology.

13. The wireless charging device according to claim 8, wherein the first wireless charging technology comprises any one of the following:

electromagnetic induction, electromagnetic resonance, a radio wave, and electric field coupling.

14. The wireless charging device according to claim 8, wherein the second wireless charging technology comprises any one of the following:

electromagnetic induction, electromagnetic resonance, a radio wave, and electric field coupling.

15. A flexible printed circuit FPC, wherein the FPC is used in a wireless charging system and comprises:

a first coil, configured to transmit an electromagnetic signal based on a first wireless charging technology; and a second coil, configured to transmit an electromagnetic signal based on a second wireless charging technology, wherein the first wireless charging technology and the second wireless charging technology support different resonance frequency ranges.

16. The FPC according to claim 15, wherein the first coil and the second coil share a same magnetic shielding material on the flexible printed circuit FPC.

17. The FPC according to claim 15, wherein the disposition of the first coil and the second coil in the FPC meets any one of the following conditions:

the second coil is disposed on the periphery of the first coil;

the first coil and the second coil are disposed in parallel; or the first coil and the second coil have a laminated structure.

18. The FPC according to claim 15, wherein the first wireless charging technology comprises any one of the following:

electromagnetic induction, electromagnetic resonance, a radio wave, and electric field coupling.

19. The FPC according to claim 15, wherein the second wireless charging technology comprises any one of the following:

electromagnetic induction, electromagnetic resonance, a radio wave, and electric field coupling.

20. A wireless charging system, comprising the to-be-charged device according to claim 1 and a wireless charging device, the wireless charging device comprising:
- a first transmitting coil, configured to convert an alternating current signal into an electromagnetic signal based on a first wireless charging technology and transmit the electromagnetic signal; and
- a second transmitting coil, configured to convert an alternating current signal into an electromagnetic signal based on a second wireless charging technology and transmit the electromagnetic signal, wherein the first wireless charging technology and the second wireless charging technology support different resonance frequency ranges.

* * * * *

UNITED STATES PATENT AND TRADEMARK OFFICE
CERTIFICATE OF CORRECTION

PATENT NO. : 11,894,694 B2
APPLICATION NO. : 17/776358
DATED : February 6, 2024
INVENTOR(S) : Haibin Zhou et al.

Page 1 of 1

It is certified that error appears in the above-identified patent and that said Letters Patent is hereby corrected as shown below:

On the Title Page

(71) Applicant: "Honor Device Co., Ltd., Guangdong (CN)" should read "Honor Device Co., Ltd., Shenzhen (CN)"

(72) Inventors: "Haibin Zhou, Guangdong (CN)" should read "Haibin Zhou, Shenzhen (CN)"

(72) Inventors: "Zhongyong He, Guangdong (CN)" should read "Zhongyong He, Shenzhen (CN)"

(72) Inventors: "Chen Zhu, Guangdong (CN)" should read "Chen Zhu, Shenzhen (CN)"

(72) Inventors: "Yupeng Qiu, Guangdong (CN)" should read "Yupeng Qiu, Shenzhen (CN)"

Signed and Sealed this
Twenty-sixth Day of March, 2024

Katherine Kelly Vidal
*Director of the United States Patent and Trademark Office*